United States Patent [19]
Bender

[11] Patent Number: 5,829,370
[45] Date of Patent: Nov. 3, 1998

[54] REARWARD FOLDING MULTI-ROW CROP PLANTER

[76] Inventor: Harold C. Bender, R.R. 1 Box 166, Poseyville, Ind. 47633

[21] Appl. No.: 676,776

[22] Filed: Jul. 8, 1996

[51] Int. Cl.⁶ ..................................................... A01C 5/02
[52] U.S. Cl. ............................... 111/54; 111/120; 111/20; 172/311; 172/456; 172/776
[58] Field of Search ..................................... 172/311, 456, 172/776, 616, 617, 459, 4.5; 111/118, 57, 59, 119, 120, 54; 16/371, 367, 287, 366

[56] References Cited

U.S. PATENT DOCUMENTS

| Re. 4,499 | 8/1871 | Wight et al. . | |
|---|---|---|---|
| 18,360 | 10/1857 | Squier . | |
| 335,830 | 2/1886 | Morgan . | |
| 978,363 | 12/1910 | Frantz et al. . | |
| 1,676,130 | 7/1928 | Brower et al. . | |
| 1,776,860 | 9/1930 | Krause . | |
| 3,115,853 | 12/1963 | Gellner . | |
| 3,208,536 | 9/1965 | Orendorff . | |
| 3,809,316 | 5/1974 | Dreyer . | |
| 3,913,683 | 10/1975 | Olsson et al. . | |
| 3,982,773 | 9/1976 | Stufflebeam et al. . | |
| 4,117,892 | 10/1978 | Dietrich, Sr. et al. | 172/311 |
| 4,117,893 | 10/1978 | Kinzenbaw | 172/311 |
| 4,128,131 | 12/1978 | Bucher et al. | 172/311 |
| 4,154,451 | 5/1979 | Young | 172/311 X |
| 4,214,637 | 7/1980 | Applequist | 172/311 X |
| 4,244,428 | 1/1981 | Sloan . | |
| 4,338,872 | 7/1982 | Decker . | |
| 4,529,040 | 7/1985 | Grollimund . | |
| 4,624,196 | 11/1986 | Anderson . | |
| 4,646,851 | 3/1987 | Duello | 172/311 X |
| 4,660,651 | 4/1987 | Pfenninger et al. . | |
| 4,721,168 | 1/1988 | Kinzenbaw . | |
| 4,811,795 | 3/1989 | Dean et al. . | |
| 4,944,355 | 7/1990 | Karchewski | 172/311 X |
| 4,945,997 | 8/1990 | Adee . | |
| 5,113,956 | 5/1992 | Friesen et al. | 172/456 X |
| 5,178,328 | 1/1993 | Broyhill | 172/311 X |
| 5,251,704 | 10/1993 | Bourgault et al. | 172/311 |
| 5,425,427 | 6/1995 | Haugen . | |
| 5,558,164 | 9/1996 | Clymer | 172/456 X |

OTHER PUBLICATIONS

Ninety–Five/Ninety–Six Product Catalog — Yetter Farm Equipment Brochure.
1996 Edition — Planter Attachments and Accessories Brochure.
MaxEmerge 2 Planters Brochure.
John Deere Drills Brochure.
Ground Hog From Sprayrite Brochure, Oct. 1991.

*Primary Examiner*—Terry Lee Melius
*Assistant Examiner*—Victor Batson
*Attorney, Agent, or Firm*—Woodard, Emhardt, Naughton, Moriarty & McNett

[57] ABSTRACT

A folding multi-row crop planter having coupled thereto individual planter row units. The planter having an assisted hinge that allows the planter wings to be moved from an open field position to a closed travel position. Further, the multi-row crop planter having a large central fluid storage tank for fertilizers/insecticides mounted forward of the foldable wings. The distribution of fluids occuring through a fluid network system along the planter wings.

17 Claims, 13 Drawing Sheets

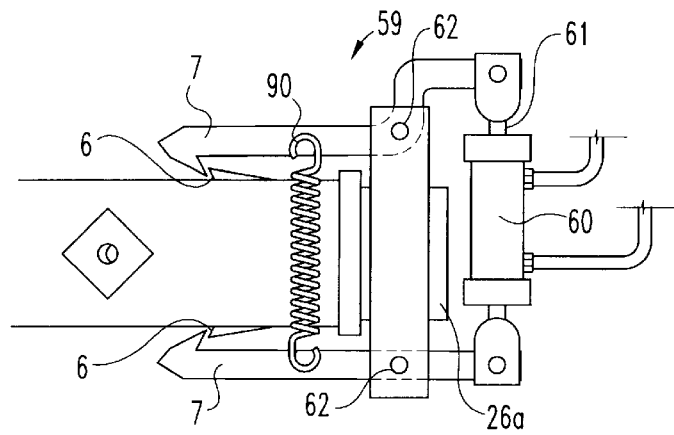
Fig. 10
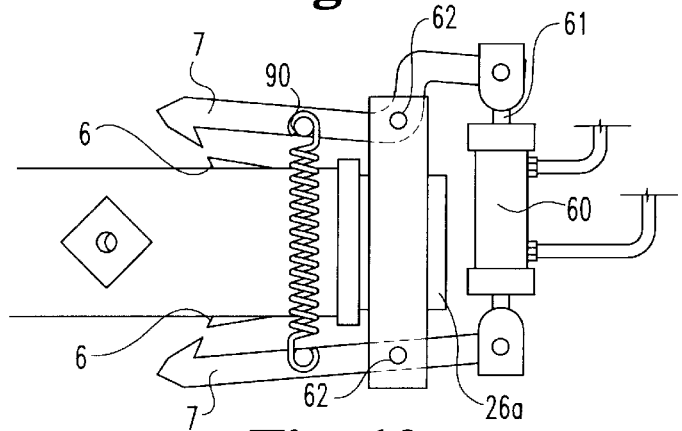
Fig. 10a
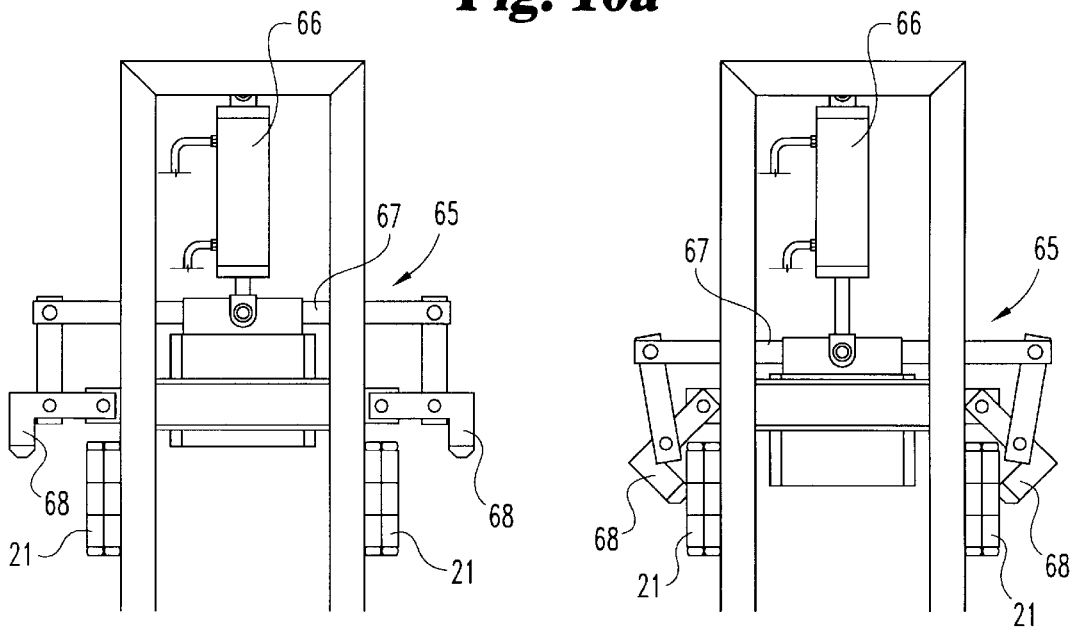
Fig. 11          Fig. 11a

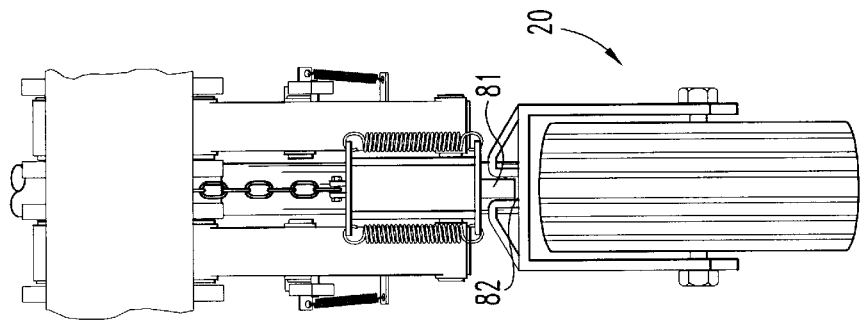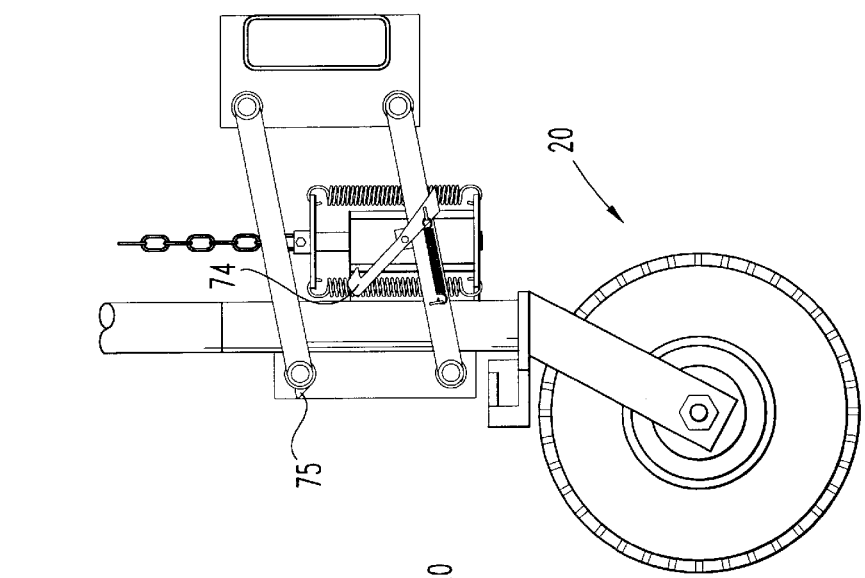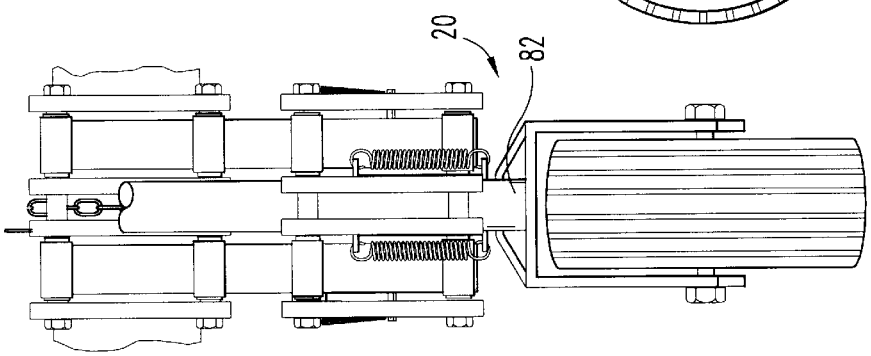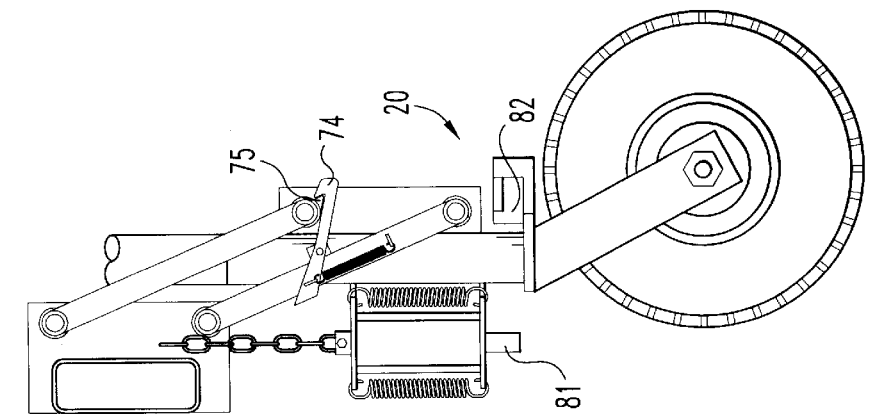

REARWARD FOLDING MULTI-ROW CROP PLANTER

BACKGROUND OF THE INVENTION

The present invention relates generally to agricultural implements pulled behind a tractor and more particularly to a folding multi-row crop planter having coupled thereto individual planter row units. Further, in one embodiment of the present invention a large forward mounted fluid storage tank for fertilizer/insecticides is integrated therewith.

Continued improvement in the performance of farm tractors has enabled agricultural implement designers to increase the width of the implements thereby taking advantage of the larger implements ability to generally work the acreage more efficiently. An important consideration relating to large agricultural implements is the mode and manner in which they are transported to and from the field, along the road, through gates, and into storage buildings. It is not unusual for the implements in the use position to be very large, for example a multi-row crop planter having 24 individual planter row units thereon may extend sixty-five (65) feet or more in the use position. Obviously such a large implement cannot be transported over roads in the same position in which it is utilized in the farm field.

Some earlier multi-row crop planters required a separate trailer for transporting the device over the road. While there are numerous limitations associated with using separate transport trailers, some of the limitations include the trailer cost, and design limitations associated with the length of the crop planter being limited by the practical consideration of having to maneuver the implement on/off the trailer. Further, valuable time of the farmer is wasted by having to load the implement onto the trailer for transfer to a second field, and upon arriving at the second field having to set up the implement which often required unhitching the tractor from the trailer and hitching the implement to the tractor.

Another common approach utilized by prior implement designers to facilitate the transport of large implements from one farm field to another farm field is the use of vertically folding side frames. A limitation associated with vertically folding side frames is that the folded implement reaches a height not suitable for passage under many bridges, gates, and shed doorways. A further limitation of prior art multi-row crop planters with vertically folding frames is that upon turning the planting hopper on it's side during folding, the planter hopper cover can come loose thereby spilling seeds during transport.

Many prior art multi-row crop planters having fertilization/insecticide dispensing devices attached thereto are limited by their ability to carry only relatively small amounts of material. Generally the prior art multi-row crop planters utilize a relatively small fluid reservoir mounted on the planter bar to provide the fertilizer and/or insecticide during the planting procedure. Locating the fluid reservoir on the moveable planter bar limits the quantity of fluid that can be carried during the planting thereby requiring frequent interruptions of the planting operation to refill the fluid reservoir. The requirement of having to constantly interrupt the planting process in order to refill the fluid tanks is often critical in view of the short time normally available when good planting conditions prevail, especially when numerous fields must be planted by the same implement.

There remains a need for a foldable multi-row crop planter having a large forward mounted fluid storage reservoir. The present invention satisfies this need in a novel and unobvious fashion.

SUMMARY OF THE INVENTION

One form of the present invention contemplates an apparatus for planting crops, comprising: a frame; a pair of arms pivotally coupled to the frame, the pair of arms having a first retracted state for transportation and a second extended state for planting; a plurality of planter row units coupled to the pair of arms for dispensing seeds; and a large fluid reservoir coupled to the frame, the reservoir being located forward of the pair of arms.

One object of one embodiment of the present invention is to provide an improved rearward folding multi-row crop planter.

Related objects and advantages of the present invention will be apparent from the following description.

BRIEF DESCRIPTION OF THE DRAWINGS

FIG. 8a is a side elevational view of the moveable ladder assembly comprising a portion of the FIG. 5 rearward folding multi-row crop planter.

FIG. 10 is an enlarged side elevational view of the moveable arm hydraulic latch in a closed position which comprises a portion of the FIG. 1 rearward folding multi-row crop planter.

FIG. 10a is an enlarged side elevational view of the moveable arm hydraulic latch in an open position which comprises a portion of the FIG. 1 rearward folding multi-row crop planter.

FIG. 11 is an illustrative view of the FIG. 6 ladder assembly which comprises a portion of the rearward folding multi-row crop planter having a hinge retaining apparatus in the open position.

FIG. 11a is a illustrative view of the FIG. 6 ladder assembly which comprises a portion of the rearward folding multi-row crop planter having a hinge retaining apparatus in the closed position.

FIG. 13 is a side elevational view of the wing wheel assembly of FIG. 12 in a castering mode.

FIG. 13a is a front elevational view of the FIG. 13 wing wheel assembly.

FIG. 14 is a side elevational view of the wheel assembly of FIG. 12a in a non-castering mode.

FIG. 14a is a front elevational view of the FIG. 14 wing wheel assembly.

DESCRIPTION OF THE PREFERRED EMBODIMENT

Figure 1:
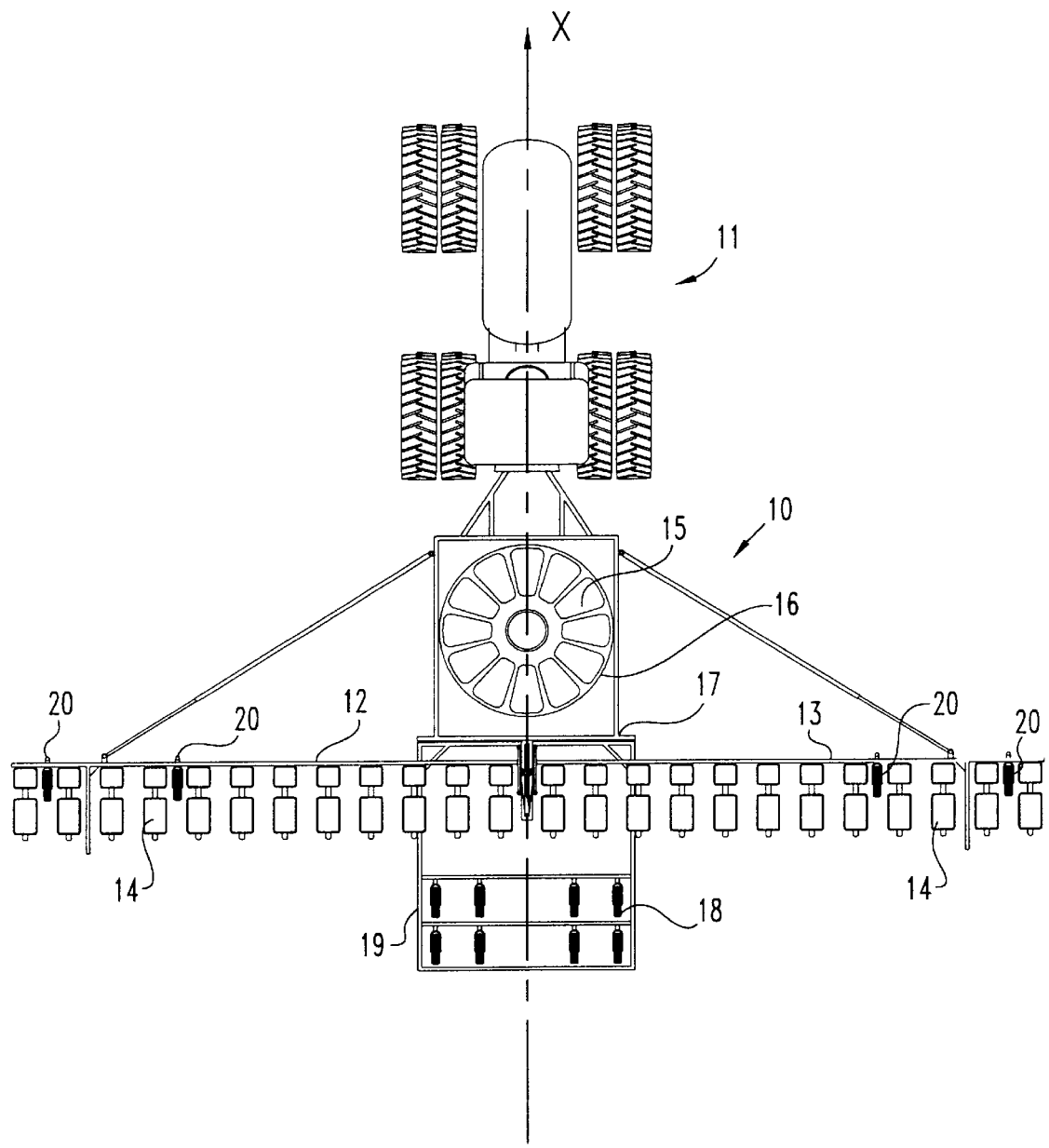
FIG. 1 is an illustrative plan view of one embodiment of the rearward folding multi-row crop planter in the open position.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

With reference to FIG. 1, there is illustrated a plan view of a rearward folding multi-row crop planter 10 coupled to a propulsion implement 11. In the preferred embodiment the propulsion implement 11 is an all wheel drive tractor. The rearward folding planter 10 includes a first foldable wing 12 and a second foldable wing 13 coupled to a pair of compound hinges 21. The wings 12 and 13 have a plurality of individual planter row units 14 coupled thereto. In the preferred embodiment there are twelve planter row units 14 per wing, for a total of 24 planter row units. However, it is understood that other quantities of individual planter row units 14 are contemplated herein.

A fluid reservoir tank 15 is mounted on the forward portion 16 of the planter 10. In the preferred embodiment the tank 15 is a large funnel bottomed tank having a capacity of about 2,500 U.S. gallons. It is understood that other styles and tank capacities are contemplated herein. A frame 17 provides the supporting structure to hold the fluid reservoir tank 15, the first foldable wing 12, the second foldable wing 13, and the rest of the components comprising the planter 10 above the working surface. In one embodiment of the present invention the frame 17 is a substantially rigid structure fabricated from steel members connected together by conventional techniques such as: welding, riveting, bolting, etc. However, other frame structures are contemplated herein provided that they have the structure necessary to support the components comprising the planter 10.

A plurality of fixed transport wheels 18 having tires 18a are coupled to the rearward portion 19 of the frame 17. In the preferred embodiment the plurality of transport wheels 18 are coupled to frame 17 so they do not pivot or swivel. It is understood that other configurations and quantities of transport wheels are contemplated herein.

Each of the pair of foldable wings 12 and 13 have a pair of wheels 20, with tire 20a, coupled thereto. In the preferred embodiment the wheels 20 are caster wheels having two modes of operation; one mode being so that the wheel can swivel three hundred and sixty degrees, and the second mode being a non-swivelable mode. It is meant herein that caster wheels mean wheels that can swivel about three hundred and sixty degrees and when locked in the second mode they do not swivel and instead track substantially parallel to a centerline X of planter 10. Normally, the caster mode is utilized for the non-planting operations associated with planter 10, and the non-caster mode is utilized when the planter wings 12 and 13 are extended and adjacent the working surface for planting in the field. During the planting intervals the wheels are locked so that they track straight ahead.

Figure 2:
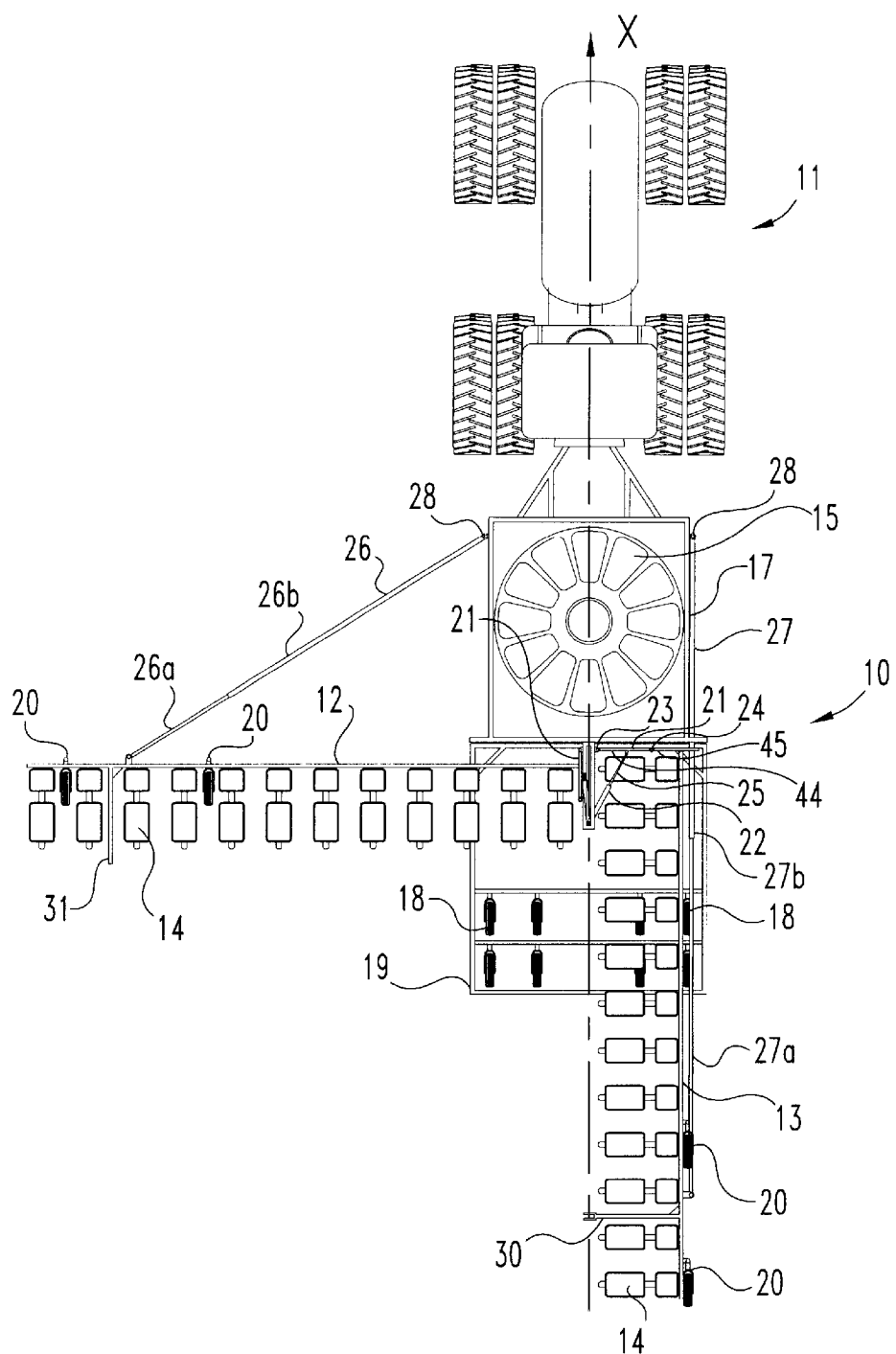
FIG. 2 is an illustrative plan view of the FIG. 1 rearward folding multi-row crop planter having one of the wings folded into a closed position.

With reference to FIG. 2, there is illustrated the rearward folding planter 10 in a partially folded condition. The first foldable wing 12 being in an open/use condition, and the second foldable wing 13 being in a closed/transport condition. Each of the pair of compound hinges 21 are actuated by an initial wedge shaped pushing device that pushes them outwardly into an initial open state, thereafter a hydraulic cylinder 22 assists in pushing the hinges to a fully open state. Further, hydraulic cylinders 22 being actuated later for assisting in pulling the hinges into a closed position. In the preferred embodiment the hydraulic cylinders utilized in rearward folding planter 10 are double acting, thereby having the capability to assist in pulling or pushing on the component coupled thereto. Compound hinge 21 having a first pivot point 23 coupled to a vertically moveable assembly and a second pivot point 24 spaced therefrom. Second pivot point 24 connects a first plate 44 hingedly to a second plate 45. Each of the plates 44 and 45 being of a substantial load carrying structure. Hydraulic cylinder 22 having an extendable ram 25 connected to the first plate 44 for assisting in pushing the compound hinge 21 into a open position, and later for assisting in pulling the compound hinge 21 into a closed position. High pressure hydraulic fluid is provided to each of the components as needed by a hydraulic pressure system which includes a pump. It is understood that the source of high pressure fluid can be contained on the planter 10, or delivered from the tractor 11 to the planter. The distribution of high pressure fluid throughout planter 10 is believed within the scope of a person of ordinary skill in the art.

A pair of pivotable and extendable arms 26 and 27 are connected between the frame 17 and the wings 12 and 13 respectively. A joint 28 connects each of the arms 26 and 27 to the frame 17, and it is preferred that the joint be of a universal type that allows multiple degrees of freedom of movement. The arms 26 and 27 each having a latching mechanism that allows a respective inner member 26a and 27a to slide relative to a respective outer member 26b and 27b. Situated between the sliding members are friction reducing materials that are generally known to those skilled in the art, including but not limited to grease, teflon, and graphite. Coupled near the end of the wings 12 and 13 is a mating bumper assembly 30 and a bumper arm 31 that are interengageable when the first and second foldable wings 12 and 13 are pivoted rearwardly into a closed/transport mode. The combination bumper assembly 30 and bumper arm 31 is for preventing the engagement of the individual planter row units 14 of the respective wings during transportation. It is understood that other bumper combinations are contemplated herein.

Figure 3:
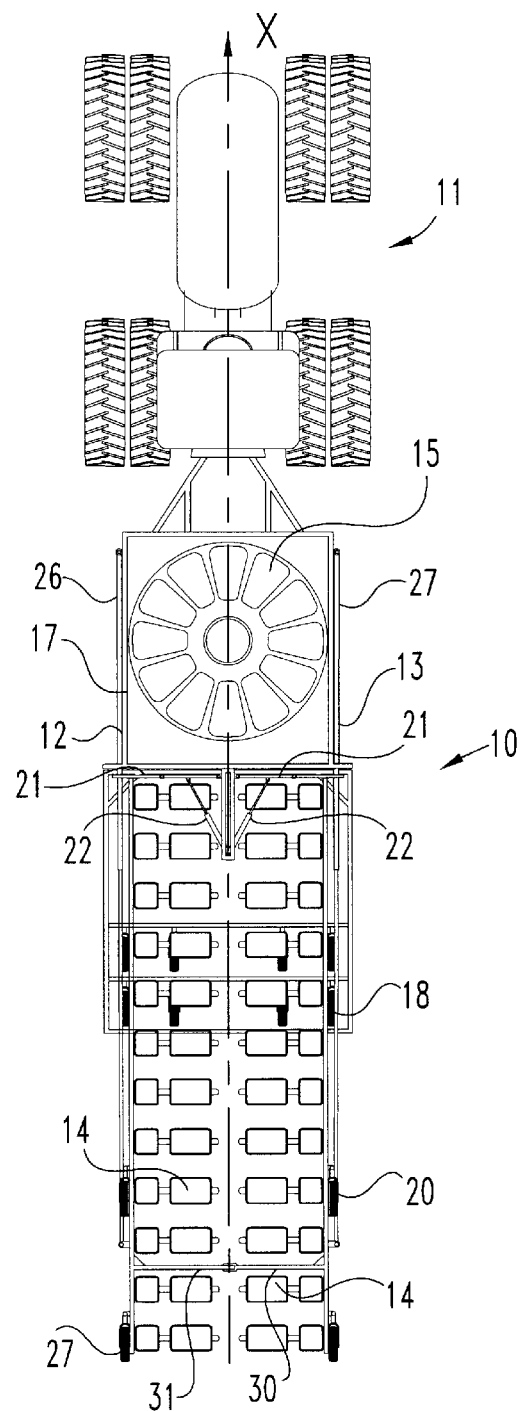
FIG. 3 is an illustrative plan view of the FIG. 1 rearward folding multi-row crop planter having both of the wings folded into a closed position.

With reference to FIG. 3, there is illustrated the rearward folding multi-row crop planter 10 with wings 12 and 13 in the closed/transport mode. The transport mode is primarily for moving the planter 10 from one place to another, such as from one farm field to another farm field. In a preferred embodiment the rearward folding planter 10 closes the wings 12 and 13 to a width that allows for the transport thereof over most roads and bridges. More particularly, the rearward folding planter 10 is designed and constructed to collapse to a width passable along a single lane of a modern road.

In the folded position the wings 12 and 13 extend rearwardly and are aligned substantially parallel to one another and the centerline X. The wings 12 and 13 being coupled to the frame 17 by compound hinges 21. Compound hinges 21 extend outwardly from and substantially transverse to the center line X of the planter 10 when the planter is in the folded/closed position. The hinges 21 have been pushed by the hydraulic cylinders and the forward movement of the rearward folding apparatus 10 into a fully open position, and a mechanical interlock mechanism (FIG. 7) is engaged to hold the hinges in this open position. In the preferred embodiment it is necessary to move the rearward folding planter 10 forward about fifty feet to obtain a fully open hinge 21. Arms 26 and 27 being in an extended position to assist in supporting and stabilizing the first and second wings 12 and 13 respectively.

Figure 4:
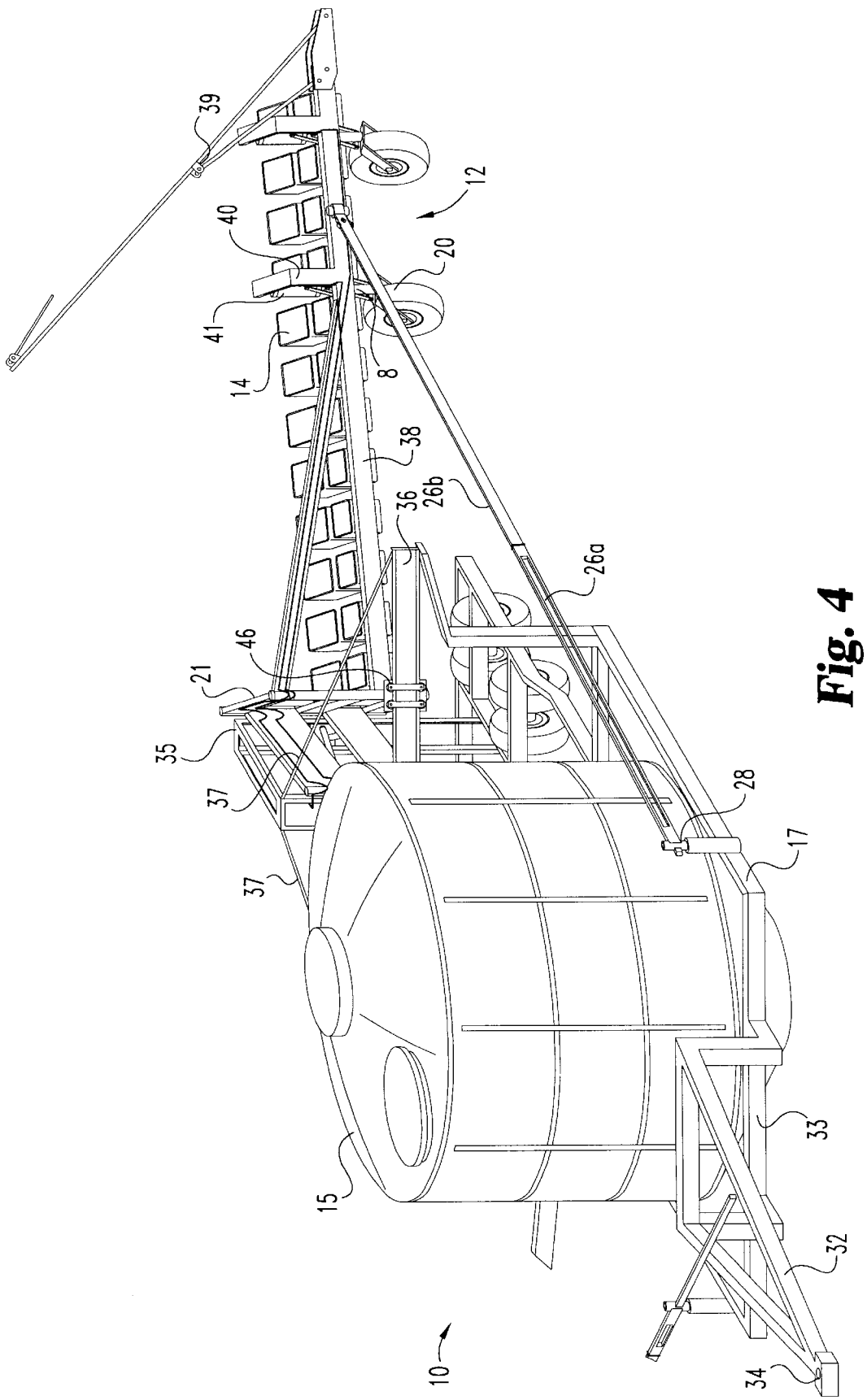
FIG. 4 is a perspective view of the FIG. 1 rearward folding multi-row crop planter in a partially open condition.

With reference to FIG. 4, there is illustrated a perspective view of the rearward folding multi-row crop planter 10 uncoupled from the tractor 11. A hitch assembly 32 is connected to the forward portion 33 of the frame 17. In the preferred embodiment the hitch assembly 32 includes a single pin receiving joint 34 to allow the planter 10 to pivot about a single point relative to the tractor 11. For the reader's convenience in understanding the present invention only one of the wings 12 has been illustrated, however, it is understood that the second wing 13 is substantially identical to the first wing 12 and is a substantial mirror image of wing 12.

The forward mounted fluid reservoir tank 15 is designed and constructed of a material suitable for liquid fertilizers and insecticides. As discussed above the preferred embodiment includes a fluid reservoir tank 15 having a bottom funnel shape that allows the substantially complete emptying of the tank. In the preferred embodiment the tank 15 is utilized for storage and subsequent distribution of fluids including fertilizers and insecticides.

Frame 17 has a substantially rigid ladder frame 35 connected thereto. The ladder frame 35 being an upstanding structural configuration with a slidable member connected therein for allowing the vertical movement of the compound hinges 21. In the preferred embodiment a roller structure 46 connects the hinges 21 to the rail 36. Rail 36 being fixedly attached to the upstanding ladder frame 35 at one end, and fixedly attached at the other end to an upstanding portion of frame 17. A plurality of additional structural braces 37 are connected between the frame components 17 to form a stiffer and more rigid assembly. It is understood that the fabrication of a frame for an agricultural implement is within the knowledge of a person of ordinary skill in the art.

Each of the compound hinges 21 being moveable in the vertical direction as the moveable member moves within the ladder frame 35. The hinges being moveable from a first lowered position wherein the planter row units 14 are positioned adjacent the working surface, to a second raised transport position wherein the individual planter row units 14 are raised substantially from the working surface. In the preferred embodiment the individual planter row units 14 are able to be elevated to a height of about three feet above the working surface for transport.

The first foldable wing 12 includes a structural frame rail 38 to which the individual planter row units 14, and the wing wheels 20 are connected. Further, a rotatable and extendable row marker 39, as is generally known to those skilled in the art, is connected to the frame rail 38. The wing wheels 20 are coupled to the frame rail 38 by a a hydraulic cylinder 41 that is attached at one end to an upstanding member 40 connected to frame 38, and at the other end to a frame 8 of wheel assembly 20. The actuation of hydraulic cylinder 21 assists in the raising and lowering of frame rail 38 to which the planter row units 14 are connected.

Figure 5:
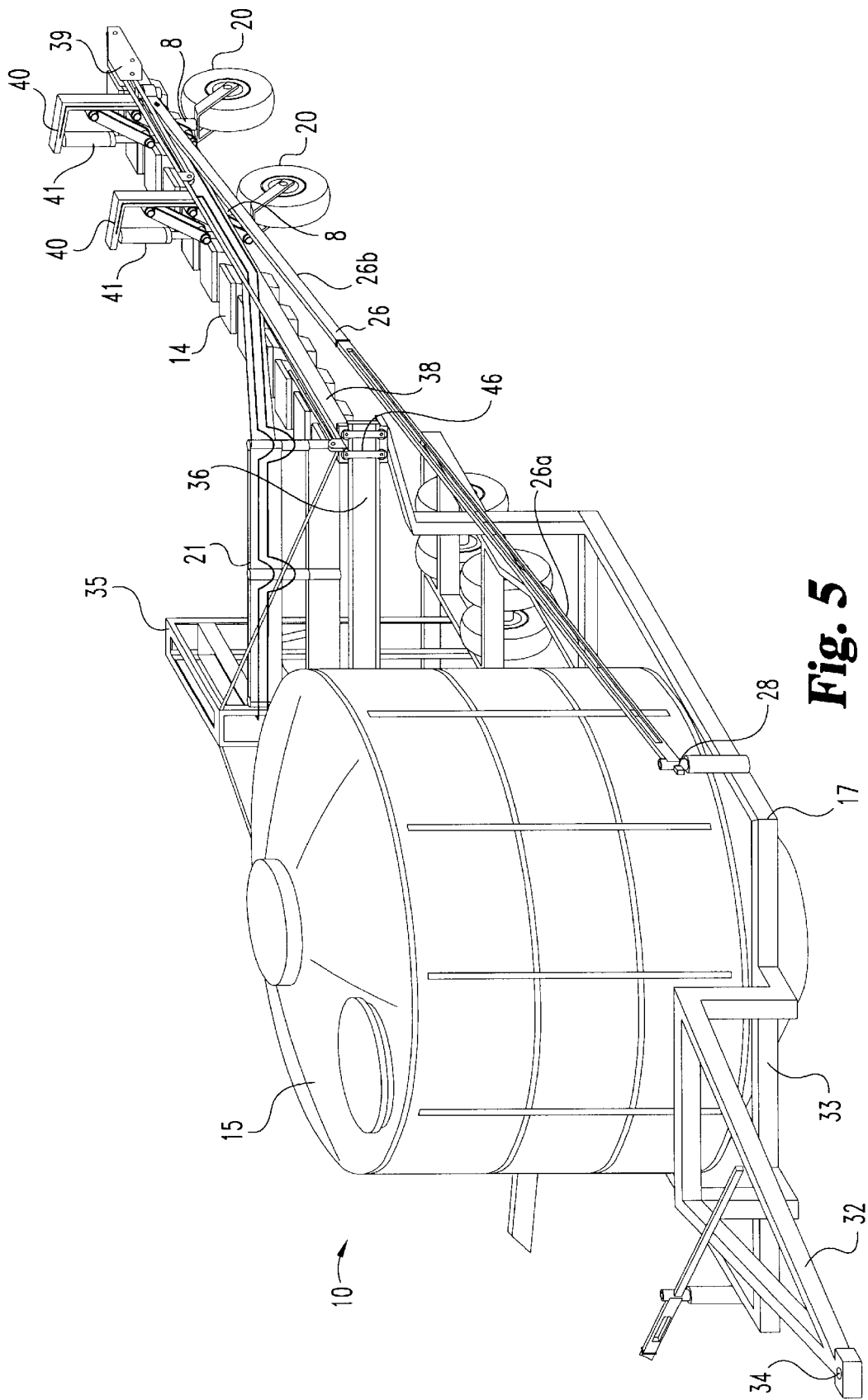
FIG. 5 is a perspective view of the FIG. 1 rearward folding multi-row crop planter with one of the wings folded into a closed position.

With reference to FIG. 5, there is illustrated the rearward folding multi-row crop planter 10 with wing 12 folded into the transport mode. For the reader's convenience in understanding the present invention wing 13 has been removed from the drawing, however it is understood that wing 13 is substantially identical to wing 12. In the folded/closed position which is primarily suited for transport the wing 12 is elevated above the working state wherein the individual planter row units 14 are close to the work surface, thereby protecting the planter row units 14 from damage. Wing 12 has been raised to the elevated state by moving the moveable member upward thereby raising compound hinge 21, and by extending the rams of hydraulic cylinders 41. Further, the pivotable and extendable arm 26 has been fully extended to provide a structural and stabilizing arm that runs along a substantial portion of the frame rail 38.

Figure 6:
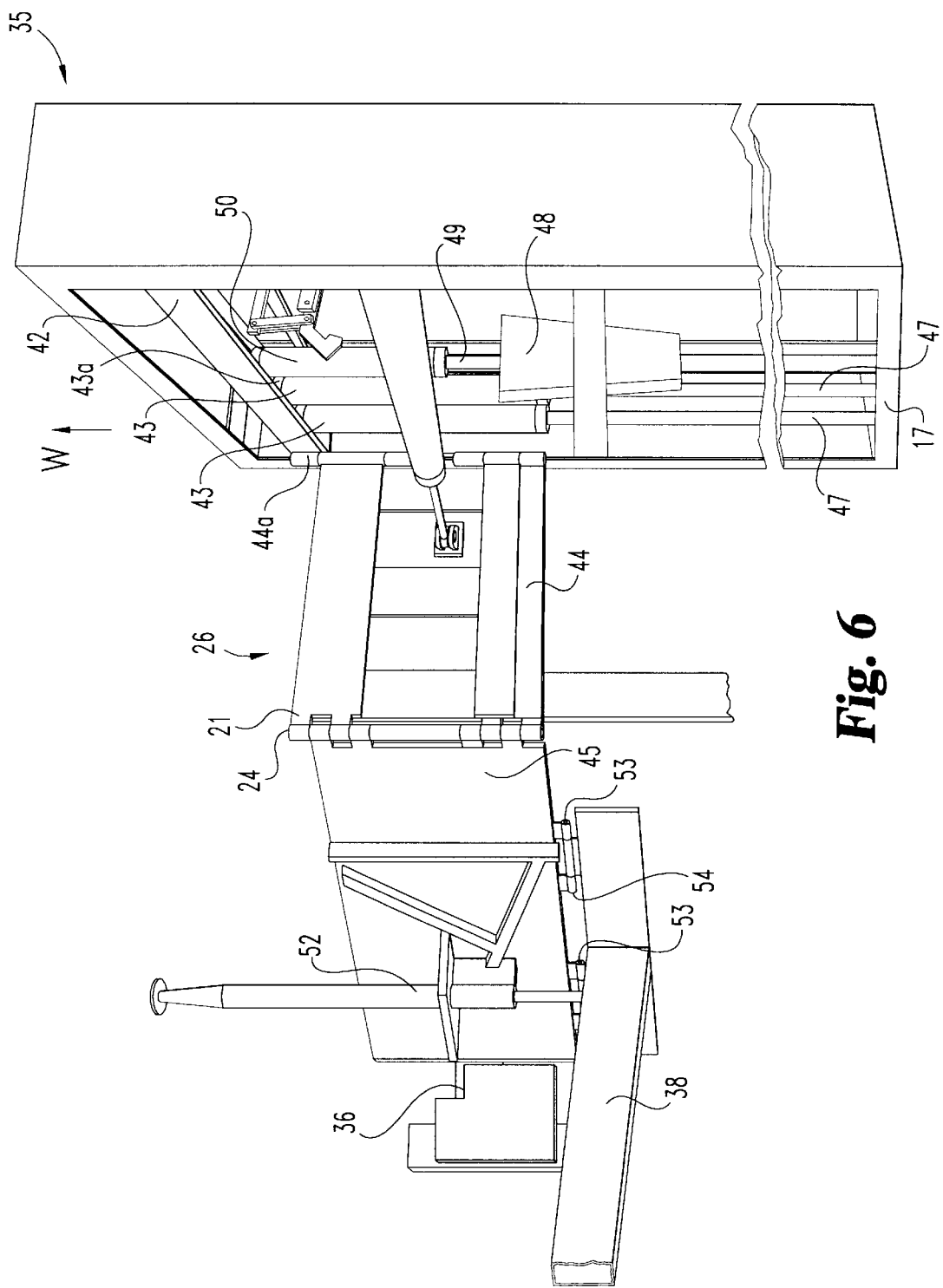
FIG. 6 is an enlarged partial perspective view of the folding hinge comprising a portion of the rearward folding multi-row crop planter of FIG. 5.

With reference to FIG. 6, there is illustrated an enlarged partial rear view of the compound hinge 21 and ladder frame 35. The first hinge plate 44 of compound hinge 21 is coupled at one end 44a to the moveable assembly 42 that is slidably positioned within ladder frame 35. The moveable assembly 42 is positioned substantially within the ladder frame 35 and is moveable in a vertical direction, as represented by arrow W, by a pair of hydraulic cylinders 43. The pair of hydraulic cylinders 43 being connected at one end 43a to the moveable assembly 42, and have an extendable ram 47 that is coupled to frame 17. Upon receiving a flow of pressurized fluid the hydraulic cylinders 43 extend the rams 47 thereby raising the moveable assembly 42 and the compound hinge 21 therewith.

A wedge shaped actuator 48 is mounted substantially within the ladder frame 35. The actuator 48 is connected to a hydraulic ram 49 which extends from hydraulic cylinder 50. Hydraulic cylinder 50 being actuated to extend the ram 49 thereby forcing the actuator 48 it into engagement with the first hinge plate 44 of compound hinge 21 when it is in the closed position. The movement of actuator 48 starts the hinge 21 into an open position. The hydraulic cylinder 22 is connected between the moveable assembly 42 and the plate 44. The extension of ram 22 causes the hinge 21 to unfold into a position substantially transverse to the centerline X of the planter 10.

Hinge plate 44 is pivotally connected at pivot point 24 to the second hinge plate 45. Rail 36 extends along the forward side of the hinge 21 and connects to the supporting frame 17 of the planter 10. A guide rod 52 is connected to frame rail 38 and to rail 36, thereby allowing the hinge 21 to be guided in it's vertical motion by rod 52. Further, the hinge 21 is supported by the rail 36, and more particularly the rollers 46 engage the rail 36 as the hinge unfolds to provide a sliding support for the hinge 21.

A pair of hinges 53 pivotally connect the frame rail 38 to the lower portion of the second hinge plate 45. The hinges 53 allow the frame rail 38 to rotate about hinge pins 54, thereby enabling the geometry of the frame rail 38 to adjust as the vertical height of the hinge 21 changes.

Figures 7, 7A:
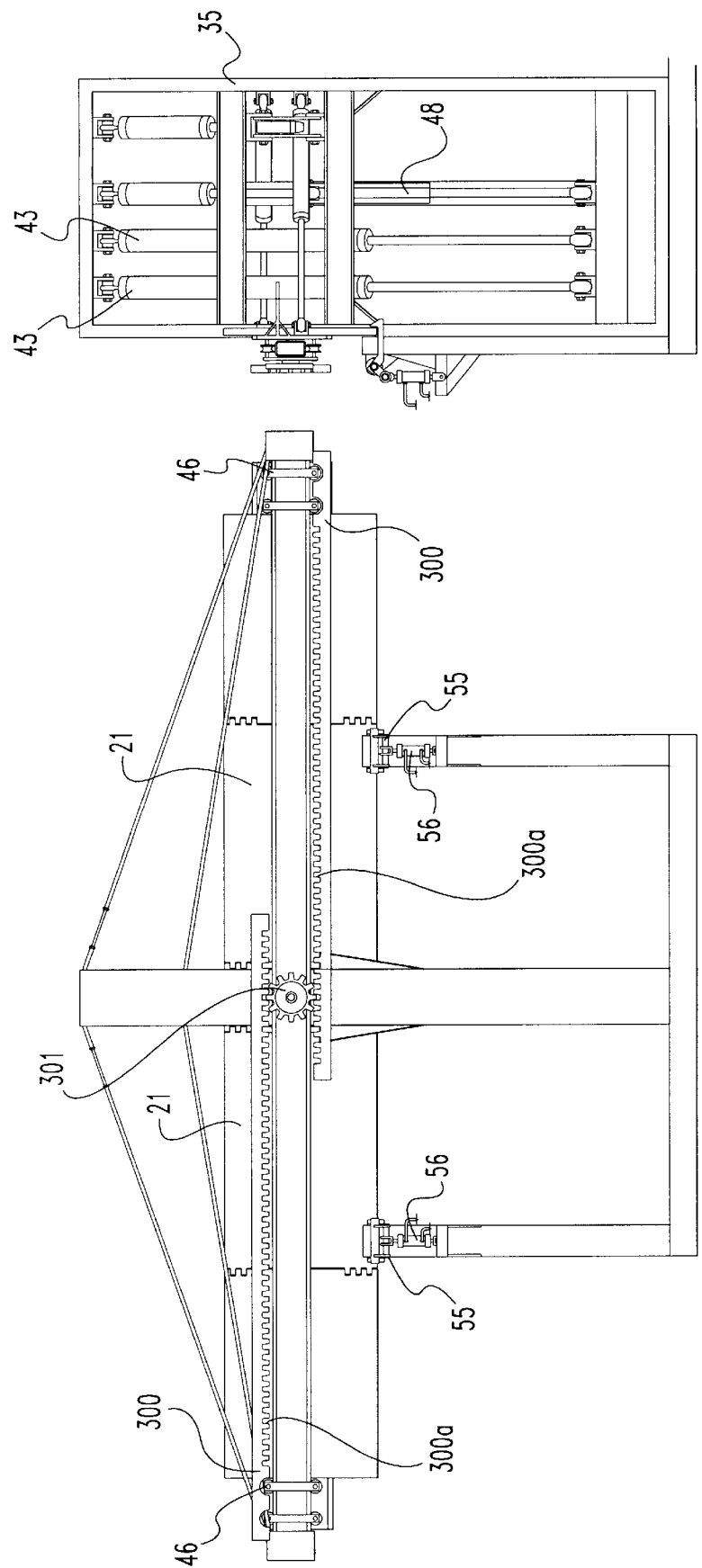
FIG. 7 is a front elevational view of the rearward folding hinge and supporting frame comprising a portion of the rearward folding multi-row crop planter of FIG. 5.
FIG. 7a is a side elevational view of the moveable ladder assembly comprising a portion of the rearward folding multi-row crop planter of FIG. 5.
Figure 8:
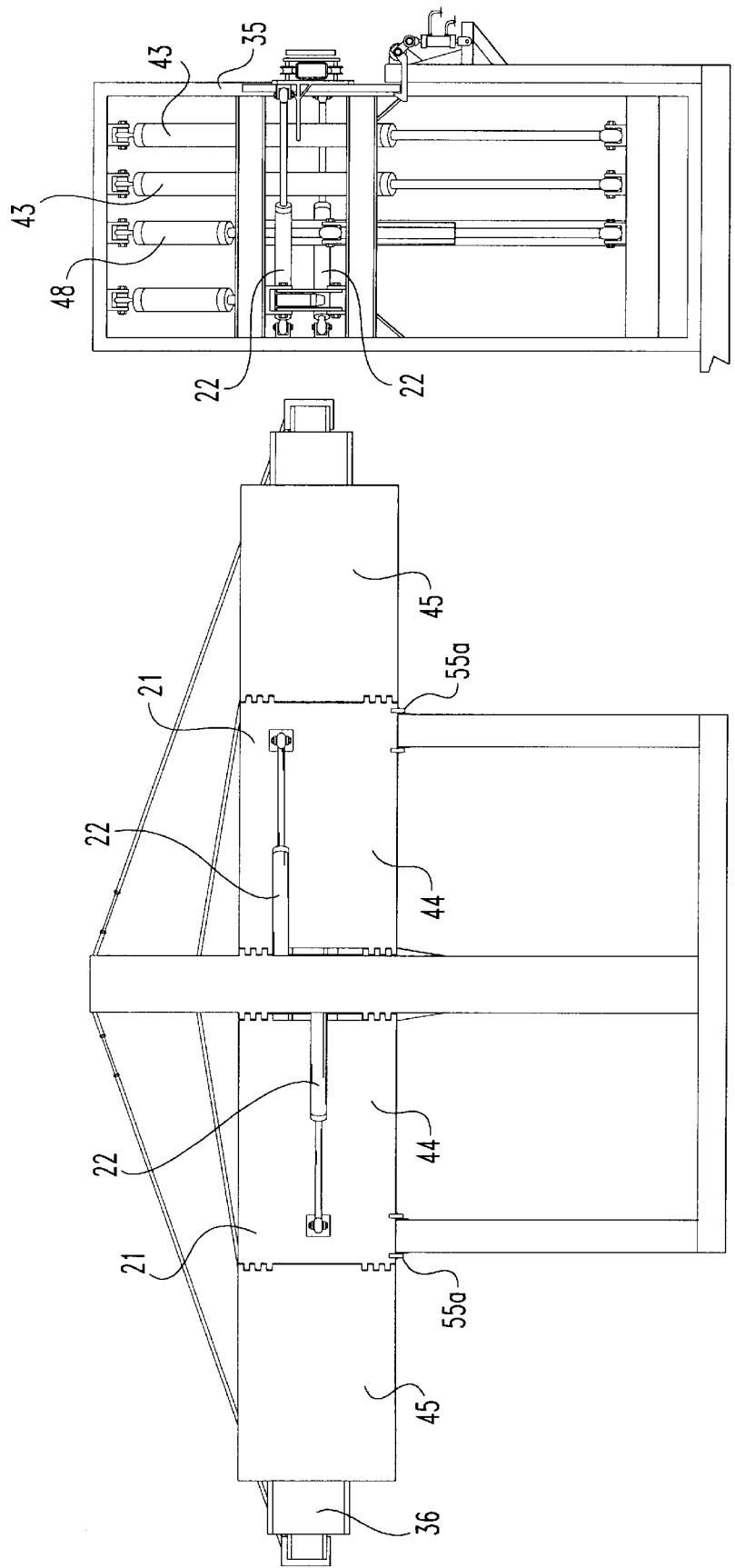
FIG. 8 is a rear elevational view of the folding hinge and supporting frame comprising a portion of the rearward folding multi-row crop planter of FIG. 5.

Referring to FIGS. 7 and 8, there is illustrated front and rear views of the ladder frame 35, compound hinges 21, and their associated actuating mechanisms. More particularly in FIG. 7, there is illustrated the pair of compound hinges 21 in a fully extended position. A pair of interlock mechanisms 55 being operable to lock the hinges 21 in an open position. The interlock mechanisms 55 includes a hydraulic cylinder 56 that is actuated to place a latch pawl in contact with the hinge to hold the hinge in place. Side elevational view 7a, illustrates one embodiment of the ladder frame 35 with the primary ladder hydraulic cylinders 43, the wedge shaped actuator 48, and a hydraulic actuated latch for holding the hinges in a folded/closed position. It is understood that the pressurized hydraulic fluid is distributed through the planter 10 by conventional fittings, tubing, and hoses that are generally known to people of ordinary skill in the art. Further, the planter 10 includes a centralized control structure for use by the operator in controlling the operation thereof.

In the preferred embodiment a pair of rack gears 300 are coupled to and slide with the rollers 46. The teeth 300a of each rack gear 300 forming a meshing interface with a rotatable cog gear 301. The double rack gears and cog gear 301 forming a unit that assists in the substantially even folding and unfolding of the wings 12 and 13. Integration of the double rack gear 300 and cog gear 301 into the present rearward folding planter 10 minimizes and/or prevents the substantial unfolding/folding of one wing without the substantial unfolding/folding of the other wing. In an alternate embodiment of the present invention the double rack gear and cog gear are not present, therefore allowing the possible uneven folding/unfolding of the wings.

With reference to FIG. 8, there is illustrated a rear view of the hinge assemblies 21 in an open position, which would correspond to the foldable arm 12 and 13 being stowed in a position parallel to the centerline X of the planter 10. Each of the hydraulic cylinders 22 has extended sufficiently to drive the hinge plates 44 and 45 into an unfolded position. As the hinge plates unfold the roller 46 rolls outwardly along rail 36 from the centerline X of the planter. Further, the fingers 55a of interlocking mechanism 55 are shown engaging the bottom edge of the hinge 21.

Figure 9:
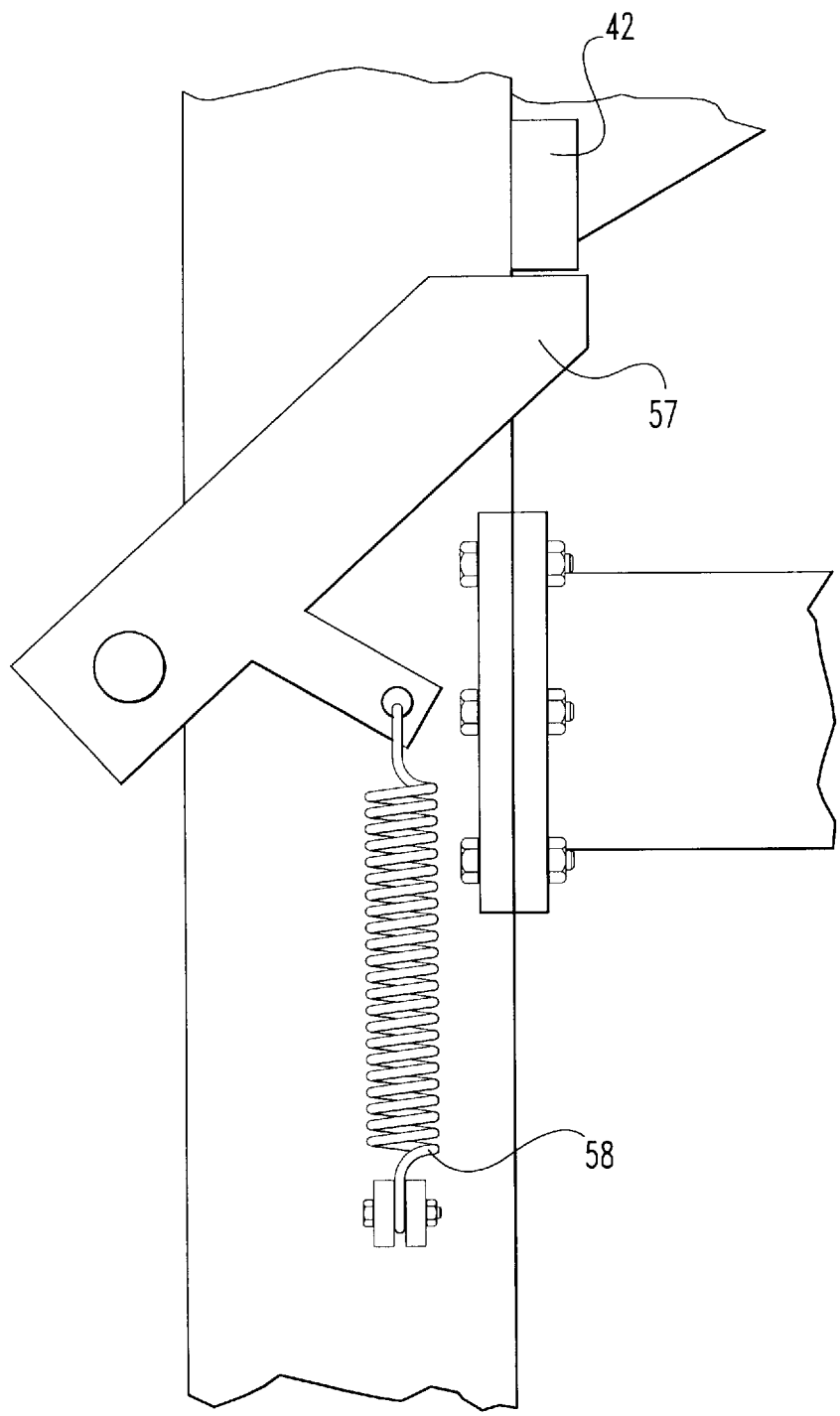
FIG. 9 is an enlarged partial side elevational view of a latch for retaining the ladder assembly of FIG. 8a in a raised position.

With reference to FIG. 9, there is illustrated a latch 57 for mechanically locking the moveable assembly 42 in the raised position. Latch 57 is rotatable between an unlatched position and a latched position by an actuation means (not illustrated). In the preferred embodiment the actuation means includes a lever that is moveable to cause latch 57 to be placed in a position to lock the moveable assembly in a raised position. A spring 58 provides sufficient force to keep latch 57 biased in the latched position. The latch 57 being provided to compensate for any pressure bleeding associated with the hydraulic cylinders that may occur over time.

With reference to FIGS. 10 and 10a, there is illustrated a latch mechanism 59 operable for controlling the movement between the inner and outer members comprising arms 26 and 27. In the preferred embodiment the latch mechanism 59 is normally spring biased closed by a spring 90. The latch is connected to the inner member 26a or 27a of the respective arms 26 and 27. A hydraulic cylinder 60 draws ram 61 inward in order to cause the latch arms 7 to rotate about pivot points 62. After ram 61 has been sufficiently withdrawn the latch arms 7 unseat from latch pawls 6, thereby uncoupling the inner and outer members of arms 26 and 27. Upon the latch arms 7 being unseated from latch pawls 6 the inner and outer members of the arms 26 and 27 are free to slide as needed. It is understood that alternative latching mechanisms are contemplated herein.

With reference to FIGS. 11 and 11a, there is illustrated a latching mechanism 65 operable for holding hinges 21 in the closed position. The latching mechanism 65 includes a hydraulic cylinder 66 for applying force to a mechanical linkage 67 that causes a pair of clamping arms 68 to be rotated into a position adjacent the folded hinge 21. Upon the latching mechanism 65 being actuated it drives the clamping arms 68 into an abutting relationship with the hinges 21 to lock them in the closed position, which corresponds to the wings 12 and 13 being placed in the field planting mode. Further, the closing of hinges 21 is accomplished by the pulling from hydraulic cylinder 22 and the rearward movement of the folding planter 10. In the preferred embodiment the planter 10 is moved about fifty feet backward to close hinges 21 and place the wings 12 and 13 in the field planting mode. It is understood that alternate clamping structures are contemplated herein for locking the hinges 21 in the closed position.

Figures 12, 12A:
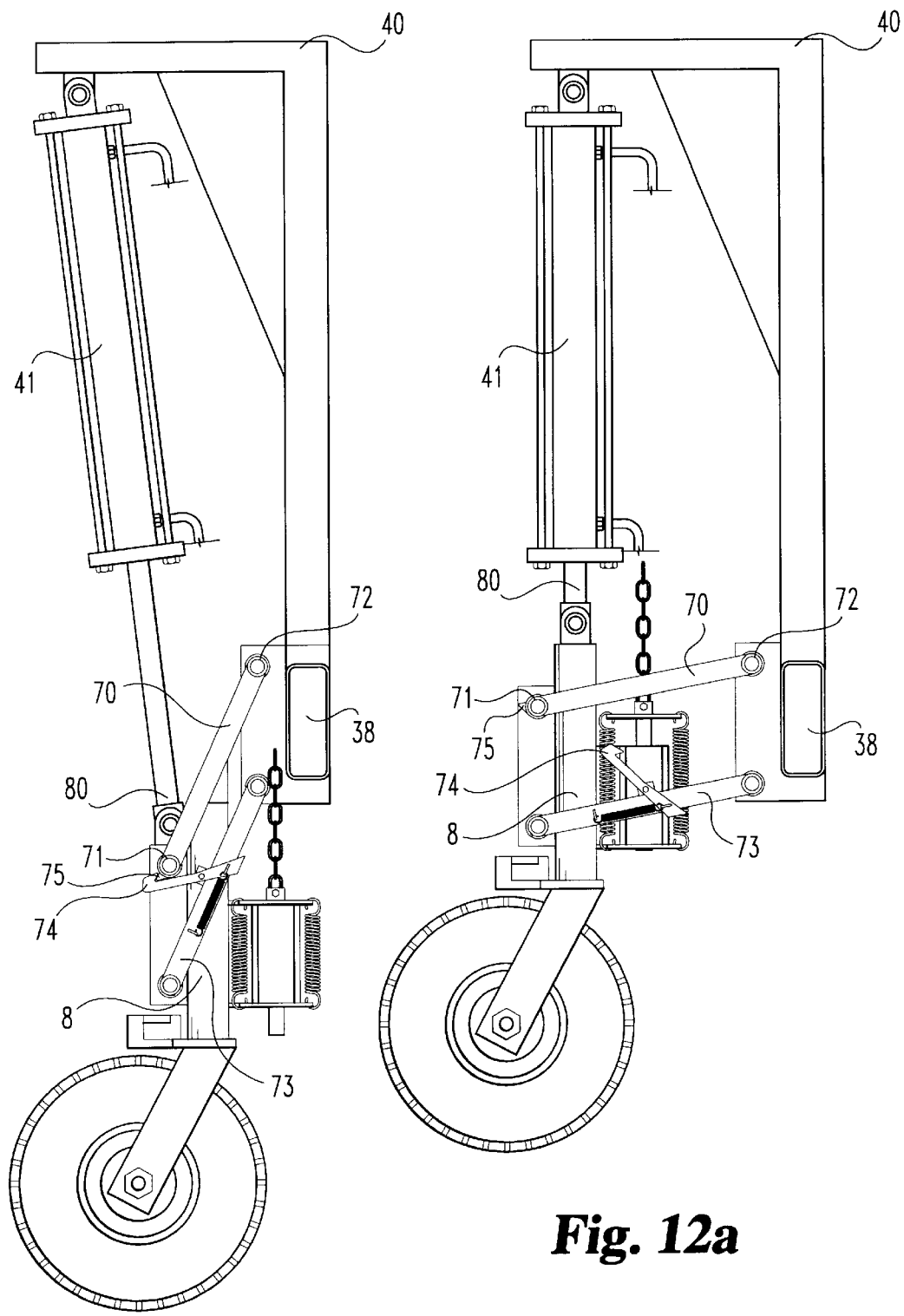
FIG. 12 is a side elevational view of the wing wheel assembly with raising mechanism comprising a portion of the FIG. 1 rearward folding multi-row crop planter in a raised position.
FIG. 12a is a side elevational view of the wing wheel assembly with raising mechanism comprising a portion of the FIG. 1 rearward folding multi-row crop planter in a lowered position.

With reference to FIGS. 12 and 12a, there is illustrated a structural tower member 40 that is connected to frame rail 38. A hydraulic cylinder 41 is connected at one end to the tower member and at it's other ram end 80 is connected to the wheel assembly frame 8. Actuation of the hydraulic cylinder 41 forces the ram to be extended thereby causing elevation of frame 38 relative to the working surface. A first structural link member 70 is pivotally coupled between the wheel assembly 8 and the tower member 40. The link being pivotally connected at a pair of joints 71 and 72. A second structural link member 73 is positioned below the first link member 70 and is pivotally coupled between the wheel assembly frame 8 and the tower member 40. The second link member 73 having a spring biased latch 74 that is engageable with a latch pawl 75 on the wheel assembly 8. The latch 74 upon engaging the latch pawl 75 prevents the folding of the link members 70 and 73 so as to insure that frame rail 38 is held at the maximum vertical distance from the working surface.

Referring to FIG. 12a, there is illustrated the frame 38 in a retracted state which is associated with hydraulic ram 80 being withdrawn and latch 74 being disengaged from latch pawl 75. Upon disengagement of the latch 74 from latch pawl 75 the first and second link members shift to a relatively horizontal position, thereby dropping the frame 38 closer to the working surface. With the frame rail 38 shifted into this position the planter places the planter row units 14 in a position for planting.

With reference to FIGS. 13 and 13a, there is illustrated wheel 20 in a caster position. Each of the wheels 20 include a locking pin 81 that is normally spring biased downward so as to lock with a cavity 82. With the latch 74 engaging the latch pawl 75 the pin 81 does not extend downward into the cavity 82 and the wheel is free to swivel about three hundred and sixty degrees. In the operation of planter 10 after the hydraulic cylinder 41 has allowed ram 80 to retract sufficiently and latch 74 is undone from latch pawl 75 the planter is backed up to place pin 81 into cavity 82.

With reference to FIGS. 14 and 14a, there is illustrated the latch pin disposed in a locking relationship with cavity 82. Upon the pin being engaged within the cavity 82 the wheel is prevented from castering or swiveling. The wheel 20 being lockable in the non-swivel position upon the latch 74 being disengaged from the latch pawl 75 and hydraulic ram 80 being withdrawn to bring the components of the wheel lock into a mating relationship.

Figure 15:
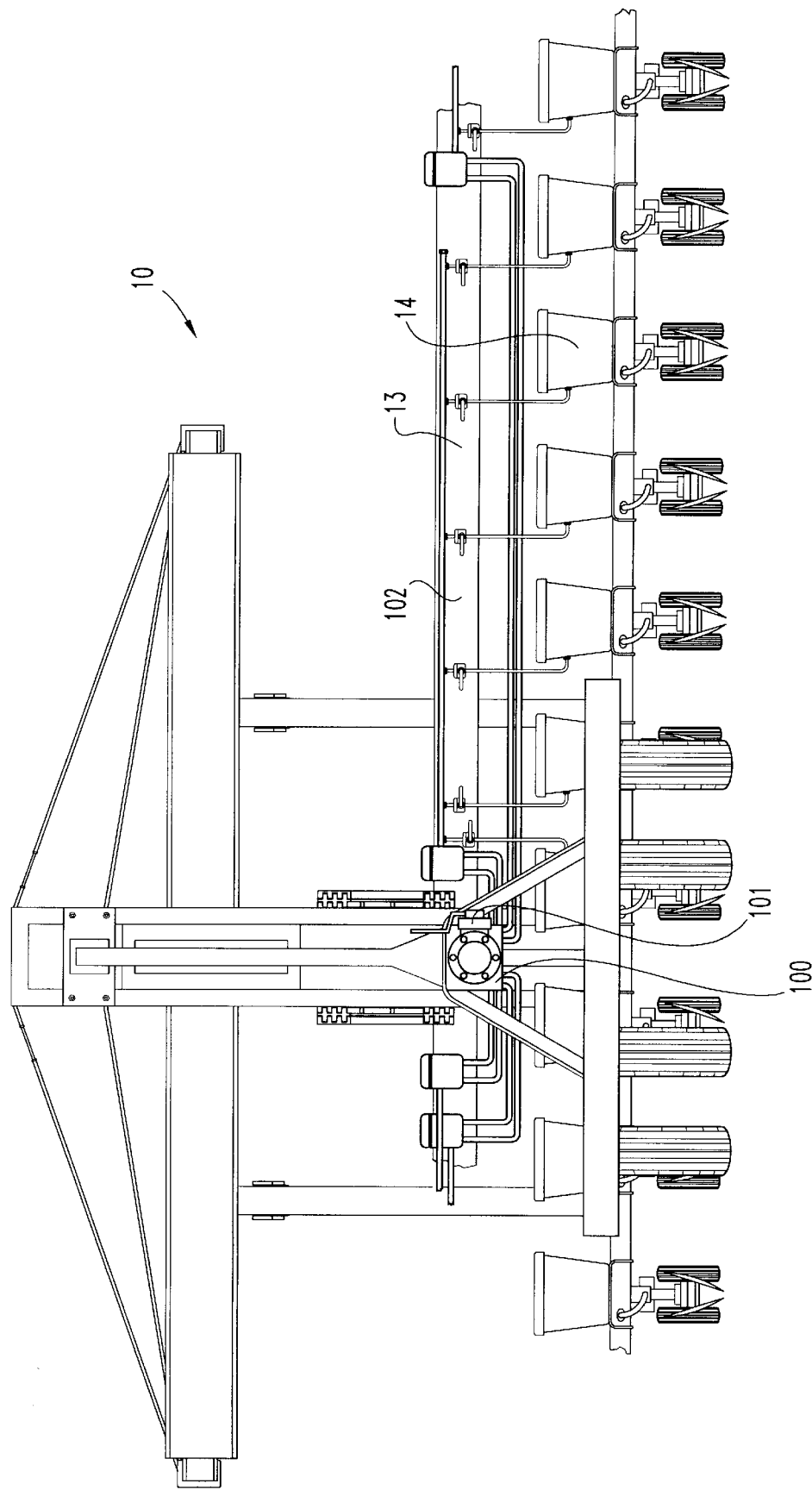
FIG. 15 is an illustrative rear view of the FIG. 1 rearward folding multi-row crop planter with a fertilizer/insecticide delivery system.

With reference to FIG. 15, there is illustrated a rear elevational view of the planter 10. In the preferred embodiment planter 10 includes a central fluid passageway 100, extending along the centerline x, that is connected to the base of storage tank 15. The passageway 100 having a controllable input 101 for allowing the introduction of fluid into the tank 15 for refilling. The central fluid passageway 100 is connected via auxiliary passageways to a manifold system 102 located on each arm 12 and 13 to provide the distribution of fluid adjacent each of the planter row units 14. Further, there is associated with the fluid distribution system a series of valves, regulators, and filters that are operable to enhance the control of the fluid passing through the fluid distribution network.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus for planting crops, comprising:
   a frame;
   a pair of arms pivotally coupled to the frame, said pair of arms having a first state for transportation and a second state for planting;
   a plurality of first wheels coupled to said frame and adapted for engaging the surface beneath the apparatus, wherein at least one of said plurality of first wheels is a fixed transport wheel that does not swivel and is coupled to the rearward portion of said frame;
   at least one second wheel coupled to each of said pair of arms, said at least one second wheel is a caster wheel having a first mode of operation wherein said caster wheel can swivel about three hundred and sixty degrees and a second mode of operation wherein said caster wheel cannot swivel;
   a plurality of planter row units coupled to said pair of arms for dispensing seeds; and
   a large fluid reservoir coupled to said frame, said reservoir located forward of said pair of arms and said wheels when said pair of arms are in said first state for transportation.

2. The apparatus of claim 1, wherein said fluid reservoir defines a tank having a capacity of about 2,500 gallons, and wherein said pair of arms are moveable vertically independent of said frame to assist in pivoting from said first state to said second state.

3. The apparatus of claim 2, which further includes a central fluid passageway extending along a portion of said frame and coupled to said fluid reservoir, and which further includes a fluid distribution system on each of said pair of arms to provide fluid adjacent each of said plurality of planter row units.

4. The apparatus of claim 1, wherein said frame has a forward portion adapted for being coupled to a towing apparatus and an opposite rearward portion, and wherein said pair of arms pivot towards said rearward portion so as to be placed in said first state.

5. The apparatus of claim 4, wherein there are twelve planter row units on each of said pair of arms, and wherein said pair of arms are moved vertically to assist in pivoting from said first state to said second state without raising said fluid reservoir.

6. A farm implement for planting crops that is also moveable along a roadway, comprising:
   a frame member has a forward portion adapted for being coupled to a towing vehicle and a rearward portion;
   a pair of arms coupled to said frame and being moveable between a first transportation state wherein said pair of arms are aligned with said frame member and extend towards said rearward portion so as to allow the passage of the farm implement along the roadway, and a second state wherein said pair of arms are positioned substantially transverse to said frame for planting crops;
   a plurality of material dispensers coupled to each of said pair of arms; and
   elevation means for vertically moving said pair of arms independent of said frame member so as to facilitate positioning of said pair of arms in one of said states, said elevation means including at least one hydraulic cylinder for raising each of said pair of arms, and said elevation means further including a moveable member coupled to said hydraulic cylinder and slidable vertically relative to said frame so that the pair of arms are guided with the assistance of the moveable member during the raising and lowering thereof.

7. The farm implement of claim 6, which further includes an upstanding ladder frame coupled to said frame, said moveable member being slidably coupled to said ladder frame, and which further includes a wedge shaped actuator within said ladder frame for assisting in the movement of said pair of arms from said first state to said second state.

8. The farm implement of claim 7, which further includes a plurality of ground engaging wheels coupled to each of said pair of arms, and which further includes a hydraulic cylinder for vertically moving said wing relative to said plurality of ground engaging wheels.

9. A farming apparatus passable over farming ground, comprising:
   a frame member elevated above the ground and adapted for being pulled behind a tractor;
   at least one wing member having a plurality of material dispensers coupled thereto;
   an upstanding frame portion coupled to said frame; and
   a compound hinge coupled to said upstanding frame portion and moveable vertically relative to said upstanding frame portion so as to allow varying the vertical position of said compound hinge while coupling said at least one wing member to said frame member to allow the movement of said wing member between a planting orientation and a transportation orientation.

10. The farming apparatus of claim 9, wherein said compound hinge includes a first member and a second member hingidly connected thereto.

11. The apparatus of claim 10, wherein said upstanding frame portion being a substantially rigid frame member, and wherein said compound hinge having a first axis of rotation between said first and second members and a second axis of rotation where said compound hinge couples to said frame.

12. The farming implement of claims 9, wherein said at least one wing member defines a pair of wing members, and wherein each of said pair of wing members are coupled to said frame by a compound hinge.

13. The farming implement of claim 12, which further includes a support rail coupled to said upstanding frame portion, and which further includes a roller assembly for each of said pair of compound hinges for coupling each of said compound hinges to said support rail, each of said roller assemblies moving along said rail as said wing members move between said planting orientation and said transportation orientation.

14. The farming implement of claim 13, which further includes a rack gear coupled to and moveable with each of said roller assemblies, and a cog gear forming a meshing interface with said rack gears to assist in the substantially even movement of the pair of compound hinges between the two orientations.

15. A farming apparatus, comprising:

a frame elevated above the ground and adapted for being pulled by a tractor, said frame having at least one frame rail;

a pair of arm members;

a plurality of planter row units coupled to each of said pair of arm members;

a pair of compound hinges for coupling said pair of arm members to said frame, said compound hinges being slidable relative to said frame so as to allow vertical movement of said compound hinges independent of said frame;

a large fluid reservoir coupled to said frame forward of said pair of arm members; and wherein said pair of arm members are moveable between a first transportation state wherein said pair of arm members are aligned substantially parallel with said at least one frame rail to facilitate the passage of the apparatus along a roadway, and a second planting state wherein said pair of arm members are positioned substantially transverse to said at least one frame rail to facilitate planting crops.

16. A farm implement, comprising:

a frame member elevated above the ground and adapted for being pulled behind a tractor;

a first wing member having a plurality of material dispensers coupled thereto;

an upstanding frame member coupled to said frame;

a first compound hinge coupled to said upstanding member for coupling said first wing member to said frame member to allow the movement of said first wing member between a planting orientation and a transportation orientation; and latching means for locking said first compound hinge in position so as to place said wing member in a planting orientation, wherein said latching means includes a clamping arm that is rotated into a position abutting said first compound hinge.

17. The farm implement of claim 16, which further includes a second wing member having a plurality of material dispensers coupled thereto, and which further includes a second compound hinge coupled to said upstanding member for coupling said second wing member to said frame member to allow the movement of said second wing member between a planting orientation and a transportation orientation; said latching means for locking said compound hinges in position so as to place said wing members in a planting orientation.

* * * * *

UNITED STATES PATENT AND TRADEMARK OFFICE
CERTIFICATE OF CORRECTION

PATENT NO : 5,829,370
DATED : November 3, 1998
INVENTOR(S): Harold C. Bender It is certified that error appears in the above-identified patent and that said Letters Patent is hereby corrected as shown below:

In col. 7, line 34, please change "arm" to --arms--.

In col. 10, line 56, please change "claims" to --claim--.

Signed and Sealed this

Eleventh Day of May, 1999

*Attest:*

Q. TODD DICKINSON

*Attesting Officer*   *Acting Commissioner of Patents and Trademarks*